United States Patent Office 3,663,488
Patented May 16, 1972

3,663,488
POLYOLEFINE FILMS
John Alan Elliott Kail, Welwyn Garden City, England, assignor to Imperial Chemical Industries Limited, London, England
No Drawing. Filed Mar. 24, 1969, Ser. No. 809,977
Claims priority, application Great Britain, Apr. 3, 1968, 16,018/68; Dec. 20, 1968, 60,717/68
Int. Cl. C08f 19/14
U.S. Cl. 260—23 H                                              7 Claims

ABSTRACT OF THE DISCLOSURE

Polyolefine film of high gloss and clarity which is suitable for twist wrapping and contains from 5% to 30% of a polyterpene, hydrogenated polyterpene or a rosin derivative.

---

This invention relates to polyolefine films and, in particular, to films which have as their major constituent a crystallisable α-olefine. Examples of crystallisable α-olefines are polymers and copolymers of propylene, ethylene (when polymerised to the "high density" forms), 4-methyl pentene-1, and 3-methyl-butene-1.

One of the major uses for polyolefine films is in packaging. A particular section of the packaging field which accounts for a significant proportion of the total is twist wrapping which is used particularly in the wrapping of confectionery, in particular sweets. Such twist wrapping is mainly done by high speed machines which can work up to a rate of 400 units/minute or greater. Most commercial machines wrap the film or other wrapping material round the sweet and then impart a twist to the projecting ends of about 1.5 or 2 times. The wrapping material then normally untwists to some extent but it is generally accepted in the industry that for an acceptably wrapped product, i.e. a product which is not unsightly and which gives adequate protection from moisture, a twist of at least 0.50 should be retained. By twists of 0.50 and 0.75 is meant that the flattened projecting ends of the wrapping material surrounding the sweet are rotated with respect to that part of the material which is in contact with the sweet by 180° and 270° respectively. It has been found that for this application oriented homopolymeric α-olefine films are not very suitable since they tend to recover after twisting to such an extent that the residual twist is less than 0.50. Unoriented homopolymeric α-olefine films, although more suitable with regard to twist retention are not sufficiently stiff and cannot be satisfactorily fed by the push-feeding mechanism which is used in most high-speed twist wrapping machines.

According to the present invention, we provide an oriented, transparent, glossy, stiff film which, when used for twist wrapping, retains at least 0.50, preferably at least 0.75 of a twist, said film comprising a composition of from 70% to 95% of a crystalline α-olefine and from 5% to 30% of a terpene polymer as hereinafter defined, a compatible hydrogenated hydrocarbon polymer as hereinafter defined or a compatible rosin derivative as hereinafter defined.

By a transparent film we mean a film which has a Gardner haze (wide angle), as measured by ASTM–D 1003–61, of less than 5%, and by a glossy film we mean a film which has a 45° specular gloss greater than 70, as measured by ASTM–D 2547–65T using a Gardner 45° specular gloss head.

We prefer that our films should in addition have an elongation to break in their transverse direction of at least 100%. Our films also preferably include sufficient of an antistatic agent so that their surface resistivity is not greater than $5.10^{11}$ ohms.

Suitable terpene polymers are those such as disclosed in B.P. 993,387 and include the polymeric, resinous materials including the dimers as well as higher polymers obtained by polymerisation and/or copolymerisation of terpene hydrocarbons such as the alicyclic, monocyclic, and bicyclic monoterpenes and their mixtures, including allo-ocimene, carene, isomerised pinene, pinene, dipentene, terpinene, terpinolene, limonene, turpentine, a terpene cut or fraction, and various other terpenes. Particularly useful starting materials are terpene mixtures containing at least 20% β-pinene and/or limonene or dipentene (racemic limonene), and the "sulphate turpentine" obtained as a by-product in the sulphate pulping process.

The polymerisation of the terpene or mixture of terpenes can be carried out in known manner with or without solvent and utilising a known catalyst such as sulphuric acid, phosphoric acid, fuller's earth, boron trifluoride, amphoteric metal chlorides such as zinc chloride or aluminium chloride, and so on. The polymerisation is preferably carried out under conditions which cause substantially all of the monoterpenes to react with minimum dimer formation.

While any of the polymers prepared by methods known to the art having average molecular weights of about 500 (Rast) and above and softening points above 70° C. (Hercules, drop) are operable herein, the preferred terpene polymers which are particularly effective in providing the improvements in accordance with the invention are characterised by molecular weights above 600 (Rast method) and softening points above 100° C. (Hercules, drop).

Suitable compatible hydrogenated hydrocarbon polymers are those which have an iodine value less than 50, a drop softening point above about 70° C. and an average molecular weight (Rast) of about 500 and above. Such materials are disclosed in B.P. No. 1,024,718 and include the polymers produced by the hydrogenation of the resinous polymerisation products obtained by the catalytic polymerisation of mixed unsaturated monomers derived from the deep cracking of petroleum, as well as higher polymers obtained by polymerisation and/or copolymerisation of terpene hydrocarbons such as the acyclic, monocyclic, and bicyclic monoterpenes and their mixtures, including allo-ocimene, carene, isomerised pinene, pinene, dipentene, terpinene, terpinolene, limonene, turpentine, a terpene cut or fraction, and various other terpenes, followed by hydrogenation under pressure. Particularly useful starting materials which can be polymerised and then hydrogenated to form the polymers employed in this invention are mixtures of unsaturated monomers composed essentially of dienes and reactive olefines derived from deep cracking petroleum, the vinyl-aromatic hydrocarbon cuts or fractions separated by distilling cracked petroleum, and the terpene mixtures containing at least 20% β-pinene and/or limonene or dipentene (racemic limonene), and the "sulphate turpentine" obtained as a by-product in the sulphate pulping process.

The polymerisation of the petroleum products or the terpenes or mixture of terpenes can be carried out in known manner with or without solvent and utilizing a known catalyst such as sulphuric acid, phosphoric acid, fuller's earth, boron trifluoride, amphoteric metal chlorides such as zinc chloride or aluminium chloride, and the like. The polymerisation is preferably carried out under conditions which cause substantially all of the hydrocarbon monomer to react with minimum dimer formation.

The hydrogenation of the hydrocarbon polymer can be carried out utilising a catalyst such as nickel, nickel on kieselguhr, copper chromite, palladium on carbon, platinum on alumina, or cobalt plus zirconia on kieselguhr. The hydrogenation is preferably carried out in the presence of a solvent such as methyl cyclohexane, toluene, p-menthane, hydrogenated terpene dimer-trimer, and the like, utilising pressures ranging from 500 to 10,000 p.s.i. and a temperature between 150 and 300° C.

While any of the hydrogenated hydrocarbon polymers prepared by methods known to the art and having average molecular weights of about 500 (Rast) and above, an iodine value less than about 50, a drop softening point above about 70° C., and compatibility with the polyolefine are operable herein, the preferred hydrogenated hydrocarbon polymers which are particularly effective in providing the improvements in accordance with the invention are characterised by average molecular weights above about 600 (Rast method), softening points above 100° C. (Hercules, drop) iodine values less than about 15, and compatibility with the polyolefine.

Suitable compatible modified rosins are described in B.P. 1,061,366 and include (1) Modified rosins of the group consisting of hydrogenated rosin, disproportionated rosin, polymerised rosin, condensation adducts of rosin and unsaturated, carbocyclic compounds, hydrogenated disproportionated rosin, hydrogenated polymerised rosin, and hydrogenated condensation adducts of rosin and unsaturated carbocyclic compounds; (2) rosin acids of the group consisting of dihydroabietic acid, tetrahydroabietic acid, dehydroabietic acid, dihydrodextropimaric acid, tetrahydrodextropimaric acid, dihydroisodextropimaric acid, tetrahydroisodextropimaric acid, and mixtures thereof; (3) esters of the group consisting of esters of the modified rosins as defined in (1) above and alcohols derived by hydrogenolysis of methyl esters of rosin acids, and esters of the rosin acids as defined in (2) above and alcohols derived by hydrogenolysis of methyl esters of rosin acids; (4) di-rosin amine; (5) monoamides of the general formula

in which X is a radical of the group consisting of dihydroabietyl, tetrahydroabietyl, dehydroabietyl, dihydrodextropimaryl, tetrahydrodextropimaryl, dihydroisodextropimaryl, and tetrahydroisodextropimaryl radicals, and Y is an acyl radical of the group consisting of dihydroabietate, tetrahydroabietate, dehydroabietate, dihydrodextropimarate, tetrahydrodextropimarate, dihydroisodextropimarate, and tetrahydroisodextropimarate radicals; and (6) diamides of the general formula

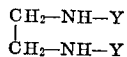

in which each Y is a radical as defined in (5) above.

The rosin derivatives suitable for the purposes of this invention may be prepared from gum rosin, wood rosin, or tall oil rosin, all of which are commercially available. The rosin derivatives of this invention are for the most part known materials, which have been adequately described in the technical and patent literature. Many are commercial products. For a clear understanding of the nature and chemistry of rosin and rosin derivatives, there is an excellent technical description in the Encyclopedia of Chemical Technology, volume 11, pages 779–810, copyright 1953 by the Intersciecne Encyclopedia, Inc., entitled "Rosin and Rosin Derivatives," by George C. Harris. The contents of this encyclopedic reference, together with the patent and technical literature references cited therein, are hereby incorporated hereinto by reference.

As pointed out hereinabove, it will be seen that the rosin derivatives which are suitable for the purposes of this invention can be grouped into 6 classes as follows:

The first of these classes comprises rosins which have been modified by hydrogenation, disproportionation, polymerisation, condensation with unsaturated carbocyclic compounds to form resinous condensation adducts, or combinations of such modifying treatments. Some typical representative members of this class include hydrogenated rosin, disproportionated rosin, polymerised rosin, specifically dimerised rosin, hydrogenated disproportionated rosin, hydrogenated dimerised rosin, condensation adduct of rosin and styrene, hydrogenated condensation adduct of rosin and styrene, condensation adduct of rosin and divinyl benzene, hydrogenated condensation adduct of rosin and divinyl benzene, condensation adduct of rosin and diisopropenyl benzene, condensation adduct of rosin and α-methyl-para-methyl styrene, condensation adduct of rosin and cyclopentadiene, hydrogenated condensation adduct of rosin and cyclopentadiene, and the like. Suitable methods for hydrogenating, disproportionating, and polymerising rosin are disclosed in the encyclopedic article by George C. Harris cited hereinabove and the patent and technical literature references cited therein.

Hydrogenated rosin for the purposes of this invention may be partially hydrogenated rosin which has been hydrogenated to the so-called "dihydro" stage, where one of the two ethylenic unsaturated linkages in the naturally occurring abietic-type and pimaric-type resin acids present in rosin has been substantially saturated with hydrogen, or fully hydrogenated rosin which has been hydrogenated to the so-called "tetrahydro" stage, where both of the two ethylenic unsaturated linkages in the naturally occurring abietic-type and pimaric-type resin acids present in rosin have been substantially saturated with hydrogen. The term "hydrogenated rosin," therefore, is used to denote any hydrogenated rosin in which at least one of the two ethylenic unsaturated linkages in the naturally occurring abietic-type and pimaric-type resin acids present in rosin has been substantially saturated with hydrogen.

The second of these classes comprises the individual resin acids which are the resin acid components of the hydrogenated rosin and disproportionated rosin of the first class. The principal members of this class include dihydroabietic acid, tetrahydroabietic acid, dehydroabietic acid, dihydrodextropimaric acid, tetrahydrodextropimaric acid, dihydroisodextropimaric acid, and tetrahydroisodextropimaric acid. These individual resin acids may be isolated by the amine salt method described in the article entitled "An Improved Method for Isolation of Resin Acids; The isolation of a New Abietic-Type Acid, Neoabietic Acid," by George C. Harris and Thomas P. Sanderson, "J. Am. Chem. Soc.," 70, 334 (1948). These individual resin acids may be mixed together in any desired combination, and this invention contemplates the use not only of the individual resin acids per se, but also mixtures of the individual resin acids in any desired combination.

The third of these classes comprises the hydroabietyl alcohol esters of the modified rosins of Class (1) above and the resin acids of Class (2) above. Some typical representative members of this class include the hydroabietyl alcohol ester of hydrogenated rosin, the hydroabietyl alcohol ester of disproportionated rosin, the hydroabietyl alcohol ester of dihydroabietic acid, the hydroabietyl alcohol ester of tetrahydroabietic acid, the hydroabietyl alcohol ester of dehydroabietic acid, and the like. Hydroabietyl alcohol may be prepared by the hydrogenolysis of the methyl ester of rosin at 300° C. and 5000 p.s.i. in the presence of copper chromite caatlyst. Conventional methods of esterification may be employed to prepare the esters, keeping in mind that the structurally hindered nature of the resin acid carboxyl group makes it necessary to use higher temperatures, of the order of 250°–300° C., and that means to remove water formed by the esterification reaction should be provided.

Di-rosin amine which constitutes the fourth class of rosin derivatives suitable for the purposes of this invention may be prepared by the hydrogenation of rosin nitrile over a nickel catalyst at temperatures above about 200° C. with removal of ammonia. It may also be prepared from rosin amine by heating in the presence of a nickel catalyst, removing ammonia as it is formed.

The monoamides which constitute the fifth class of rosin derivatives suitable for the purposes of this invention may be prepared by reacting a modified rosin of Class (1) above or a resin acid of Class (2) above with an amine derived by the ammonolysis of a modified rosin of Class (1) above or a resin acid of Class (2) above. Some typical representative members of this class include N-dehydro-abietyl hydrogenated rosin amide, N-dihydroabietyl hydrogenated rosin amide, N-tetrahydroabietyl hydrogenated rosin amide, N-dehydroabietyl disproportionated rosin amide, N-dihydrodextropimaryl dimerised rosin amide, N-dehydroabietyl dihydroabietic acid amine, N-dehydroabietyl dehydroabietic acid amide, N-tetrahydroabietyl tetrahydroabietic acid amide, and the like.

The diamides which constitute the sixth class of rosin derivatives suitable for this invention may be prepared by reacting ethylene diamine with a modified rosin of Class (1) above or a resin acid of Class (2) above at high temperatures in the range of 250°–300° C. under high vacuum to remove volatile by-products by "topping." Some typical representative members of this class include the diamide of hydrogenated rosin and ethylene diamide, the diamide of disproportionated rosin and ethylene diamine, the diamide of dehydroabietic acid and ethylene diamine, the diamide of tetrahydroabietic acid and ethylene diamine, and the like.

The composition of the crystalline α-olefine and the hydrocarbon or rosin are easily prepared by the conventional methods of mixing and blending which are used in the plastics industry. For example, the poly-α-olefine in flake powder or granule form and particles or granules of the rosin derivative may be preliminarily mixed together in a tumbling barrel, or in a Sweetie barrel, or in a ribbon mixer, or the like, and the resulting mixture then intimately blended by malaxating on a hot two-roll mill or in a Banbury mixer, or in the barrel of a heated extruding apparatus to prepare the desired "alloy" which may then be directly extruded into film, or reduced to suitable moulding powder granules by conventional comminuting methods for charging to an extrusion apparatus.

We prefer to use at least 5% of the hydrocarbon or rosin in order to obtain a material having the required properties of transparency and gloss and we prefer not to use more than 30% of the hydrocarbon or rosin since we have found that compositions containing greater than this amount are rather brittle. In fact, even compositions containing from 20% to 30% of the hydrocarbon or rosin have a tendency toward brittleness under some conditions and thus our more preferred compositions contain less than 20% of this material. As stated above, our oriented films have preferably an elongation to break in the transverse direction of at least 100%. Our films are in fact "unbalanced," i.e. they are oriented to a greater degree in their longitudinal direction than in their transverse direction.

In the longitudinal direction their properties are similar to those of a normally commercially produced and sold balanced biaxially oriented polyolefine film. Our unbalanced films may be produced by various methods. For example, they may be produced by drawing in two perpendicular directions in the plane of an undrawn film but to a greater extent in the longitudinal direction than in the transverse direction. Although this can most easily be done by drawing only in the longitudinal direction in order to produce a uniaxially oriented film, we find that such films are not suitable for the present invention since they fibrillate or at least have a tendency to fibrillate and so have a very low elongation to break in the transverse direction. Thus, we believe it is necessary to introduce some degree of drawing in the transverse direction in producing our films from undrawn film. An alternative and preferred method for producing our films is first to orient the film biaxially to substantially the same degree in the longitudinal and transverse directions and then, while preferably restraining the film from shrinkage in the longitudinal direction, allow it to shrink in the transverse direction, the last mentioned process being carried out at such a temperature that shrinkage will take place. In our preferred process for the production of our films the balanced biaxially oriented film is most conveniently produced by simultaneously drawing the oriented film in the longitudinal and transverse directions in the "bubble" process which is well known in the art. The subsequent transverse shrinkage process may then be carried out in a Stenter apparatus or, alternatively, while passing the film over a series of heated rollers, the nature of the surfaces of which and the forces with which the film is pressed onto said surfaces being such that the transverse shrinkage at any selected temperatures can occur in a controlled fashion. The last mentioned process may be carried out in an apparatus such as that described in our copending application No. 627,449 which comprises feed and take-off means for the film between which means is at least one matt surfaced rotating roll maintained at a temperature (below the melting point of the film) which would cause the film to shrink, means to force the film onto at least one of the rolls and means whereby the film is spread uniformly on at least one of the rolls onto which the film is forced. In the present case, however, we prefer at least in conjunction with the or the first matt-surfaced roll not to make use of the means which imposes an electro-static charge on the side of the film away from the roll since we find that this so restricts the transverse shrinkage as not to produce a film having the correct yielding point and elongation in the transverse direction. We have found that transverse shrinkage of at least 20% and preferably at least 35% should be allowed but shrinkages greater than 70% are not preferred since above this the shrunk film has a tendency to fibrillate. Depending on the amount of hydrocarbon or rosin present our most preferred shrinkage is from 35% to 50%. The temperature at which we carry out the transverse shrinkage is higher than that normally used in the heat-setting of polyolefine films and, for example, in the case of compositions where the major constituent is polypropylene we have found that a temperature of from 135° to 155° C. is convenient. At temperatures less than 135° C. it is difficult to achieve the properties of gloss and transparency which we require particularly if any additives, e.g., antistatic agents are present in the film. Indeed in this latter case we find it advisable to employ a heat setting temperature of at least 140° C.

Since the transparency of the film is an important feature of our invention, we prefer to reduce to a minimum the amount of other additives in the composition such as pigments, fillers, antistatic agents, ultra-violet light absorbers, antioxidants and other stabilisers.

On the other hand it is essential for many of the applications for which our film may be used that the film be relatively antistatic (i.e. has a surface resistivity not greater than $5.10^{11}$ ohms), and it is also desirable that the film be relatively slippery in order, for example, to aid feeding through twist wrapping machinery. A particularly suitable antistatic composition which may be incorporated in our films is that which we describe in our copending application No. 860,031 now U.S. Pat. 3,570,052 and which comprises in admixture one or more substances having the formula

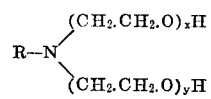

wherein the sum of $x$ and $y$ has a value from 2 to 5 inclusive and R is a monovalent aliphatic radical having from 12 to 22 carbon atoms inclusive and one or more glycerides.

In order to achieve the desired antistatic properties greater than 0.01% (by weight of the film) of the said one or more substances and greater than 1.0% of the said one or more glycerides should be incorporated in the film. However, not greater than 0.5% and 4.0%, respectively, should be incorporated in the film in order not to reduce the gloss and transparency below the required level. It is also necessary in order to achieve the optimum anti-static effect of the additive to subject the film to a high voltage electric stress accompanied by corona discharge.

It is also possible to apply a heat seal or pressure sensitive coating to the complete surface or surfaces of the film or, alternatively, to coat parts of the surfaces of the film with such a coating, e.g. those parts which will lie within the twist of the twist wrapping. The antistatic composition referred to above may be incorporated in these coatings. The film may also be treated to make it more printable, e.g. by surface chemical oxidation, or by electric discharge treatment, e.g. that used to optimise the antistatic properties.

Although the main use of the film is in twist wrapping, it may be used in other applications, for example, in various types of tape, e.g. for adhesive tapes, masking tapes, recording tapes, weaving tapes and strapping tapes. It may also be used as the feedstock for "form-fill" packaging, i.e. where a strip of film (which may be heat seal coated if necessary) is longitudinally sealed into the form of a tube which is then transversely sealed, filled with a predetermined amount of material and again transversely sealed and cut to give a package. Since, in such a machine, transverse ruptures are much more serious than longitudinal ruptures, the films of the present invention are very useful.

The invention is illustrated but in no way limited by the following examples.

EXAMPLES 1 AND 2

A composition comprising 82% of polypropylene and 18% of a hydrogenated hydrocarbon polymer obtained by the catalytic polymerisation of β-pinene was extruded in the form of a tubular film which was then quenched to approximately room temperature, heated to a temperature at which it could be oriented and stretched approximately 7.2 times in two perpendicular directions by means of the "bubble" process. The tubular film produced was slit to produce a single thickness film of width 60 inches.

Two samples of this film were passed over a series of matt surfaced heated rollers and allowed to shrink transversely on these rollers. In the one case a temperature of 139° C. was used when a transverse shrinkage of 43% occurred and in the other case at a temperature of 145° C. was used when a shrinkage of 50% occurred. The properties of the two films produced were as set out in the following table.

| Example | 1 | 2 |
| --- | --- | --- |
| Gardner haze (percent) | 1.1 | 0.6 |
| Gardner gloss | 85 | 90 |
| Yield stress (p.s.i.): | | |
| MD | 6,700 | 4,300 |
| TD | 5,700 | 4,000 |
| Break stress (p.s.i.): | | |
| MD | 26,000 | 28,000 |
| TD | 14,000 | 11,700 |
| Elongation at break (percent): | | |
| MD | 46 | 47 |
| TD | 127 | 286 |

Both of the above films were wrapped on a commercial twist wrapping machine at a speed of 420 wraps per minute and retained a twist of about 0.75 times.

EXAMPLES 3 AND 4

A composition comprising 86% polypropylene and 14% of a hydrogenated hydrocarbon obtained from the polymerisation product β-pinene was extruded in the form of a film, quenched, and drawn in a "bubble" process 7.2 times in the machine direction and 6.3 times in the transverse direction. The tubular film produced was slit to produce a flat film of width 44 inches. One portion of this film was passed over the roller heat treatment apparatus referred to above, said apparatus being at a temperature of 140° C. and was allowed to shrink transversely by 23% and a second portion of the film was similarly heat treated but at a temperature of 153° C. and the shrinkage allowed in this latter case was 53%.

The properties of the films obtained were as set out in the following table.

| Example | 3 | 4 |
| --- | --- | --- |
| Gardner haze (percent) | 4.0 | 2.3 |
| Gardner gloss | 72 | 82 |
| Yield stress (p.s.i.): | | |
| MD | 4,800 | 5,600 |
| TD | 3,600 | 4,800 |
| Break stress (p.s.i.): | | |
| MD | 24,000 | 19,500 |
| TD | 14,000 | 8,000 |
| Elongation at break (percent): | | |
| MD | 64 | 75 |
| TD | 150 | 165 |

Both of the above films when tested under commercial conditions on a twist wrapping machine running at a rate of 420 wraps per minute were found to retain a twist of about 0.75 times.

EXAMPLE 5

A composition comprising 86% by weight of polypropylene and 14% by weight of a hydrogenated hydrocarbon polymer obtained by the catalytic polymerisation of β-pinene to which composition had been added 3.0% by weight of a mixture of mono and di-glycerides (mainly glycerol mono stearate) and 0.1% by weight of bis(2-hydroxyethyl) myristyl amine was extruded in the form of a tubular film which was then quenched to approximately room temperature, heated to a temperature at which it could be oriented and stretched approximately 7.2 times in two perpendicular directions by means of the "bubble" process. The tubular film produced was slit to produce a single thickness flat film which was then passed over a series of rollers, the matt surfaces of which were maintained at a temperature of 145° C. The film shrunk in the transverse direction by 50%. The film was finally subjected to a high voltage electric stress accompanied by corona discharge. The resultant film which was 0.0009 inch in thickness had a Gardner Haze of 1.0% and a Gardner Gloss of 85. This film was used to wrap sweets and a twist retention just over 0.5 was achieved. The moisture uptake of these sweets was measured after maintaining them at a temperature of 250° C. in an atmosphere of 75% relative humidity for 30 days and was found to be 2.3%. A further sample of the sweets were tumbled by hand for one minute in a polythene bag, to simulate movement during transit. They were found to have retained a twist of 0.5 and when submitted to the moisture uptake test under the same conditions (25° C., 75% relative humidity for 30 days) had a moisture uptake which was still only 3.0%. These results are of a level which is very acceptable to the trade.

EXAMPLE 6

The composition described in Example 5 was extruded into film and stretched in the same way as described in Example 5. It was then divided into three portions and each portion heat set at a different temperature as set out in the following table which also lists the Gardner Gloss and Haze, the surface resistivity and the tensile properties of the film produced. The film was subjected to a high voltage stress accompanied by corona discharge. The twist retention in each case was 0.5.

| Property | Sample A | Sample B | Sample C |
|---|---|---|---|
| Heat-setting temperature (° C.) | 145 | 139 | 134 |
| Transverse direction relaxation (percent) | 50 | 40 | 30 |
| Gardner gloss | 85 | 87 | 54 |
| Gardner haze (percent) | 1.0 | 1.3 | 7.2 |
| Surface resistivity at 50% relative humidity after 4 weeks (ohms) | $2.6 \times 10^{10}$ | $8.4 \times 10^{9}$ | $1.2 \times 10^{10}$ |
| Tensile break strength (p.s.i.): | | | |
| Machine direction | 24,500 | 20,300 | 26,600 |
| Transverse direction | 12,100 | 16,100 | 15,200 |
| Tensile yield strength (p.s.i.): | | | |
| Machine direction | 4,800 | 4,700 | 5,700 |
| Transverse direction | 4,600 | 4,000 | 5,100 |
| Elongation at break (percent): | | | |
| Machine direction | 45 | 35 | 50 |
| Transverse direction | 155 | 135 | 90 |

EXAMPLE 7

A composition comprising 82% of polypropylene and 18% of a hydrogenated hydrocarbon polymer obtained by the catalytic polymerisation of β-pinene to which has been added 0.1% of bis(2-hydroxyethyl) myristyl amine and 1.0% of a mixture of mono- and di-glycerides mainly glycerol mono-stearate was extruded in the form of a tubular film, quenched to room temperature, heated to orientation temperature and stretched approximately 7.2 times in two perpendicular directions by means of the "bubble" process. The tubular film thus produced was slit and heat set over a heated matt roller at a temperature of 145° C. allowing a shrinkage in the transverse direction of 50%, and finally subjected to a high voltage stress accompanied by corona discharge. The above procedure was repeated twice with the exception that in the case of the first repeat 2% of the glyceride mixture was used and in the case of the second repeat 3% of the mixture was used. In each case a twist retention of about 0.70 was obtained. The other properties of the product are set out in the following table.

| Property | Glyceride 1% | Glyceride 2% | Glyceride 3% |
|---|---|---|---|
| Gardner gloss | 87 | 90 | 85 |
| Gardner haze (percent) | 1.0 | 0.2 | 0.6 |
| Surface resistivity at 50% relative humidity after 4 weeks (ohms) | $1 \times 10^{12}$ | $9 \times 10^{10}$ | $9 \times 10^{9}$ |
| Tensile break strength (p.s.i.): | | | |
| Machine direction | 23,500 | 27,500 | 24,600 |
| Transverse direction | 13,400 | 13,400 | 13,200 |
| Tensile yield strength (p.s.i.): | | | |
| Machine direction | 5,500 | 6,400 | 6,000 |
| Transverse direction | 4,200 | 4,600 | 4,300 |
| Elongation at break (percent): | | | |
| Machine direction | 60 | 55 | 50 |
| Transverse direction | 170 | 225 | 215 |

EXAMPLE 8

The composition described in Example 7 was extruded into film and stretched in the same way as described in Example 7. The tubular film thus produced was slit and heat set using a Stenter heat setter. The stenter temperature was set at 145° C. The stenter rails were converged so that they were 42 inches apart at the inlet and 24 inches apart at the exit thus allowing the film to relax by 43%. The film was then subjected to a high voltage stress accompanied by corona discharge. The film had the following properties:

Gardner gloss _____ 78
Gardner haze (percent) _____ 3.4
Surface resistivity at 50% relative humidity after 4 weeks (ohms) _____ $1 \times 10^{11}$
Tensile break strength (p.s.i.):
 Machine direction _____ 22,700
 Transverse direction _____ 13,800
Tensile yield strength (p.s.i.):
 Machine direction _____ 5,200
 Transverse direction _____ 4,100
Elongation at break (percent):
 Machine direction _____ 55
 Transverse direction _____ 170
Twist retention _____ 0.63

I claim:

1. A biaxially oriented polyolefine film formed from a composition comprising (a) from 70% to 95% by weight of a crystalline α-olefine polymer selected from the group consisting of polymers and copolymers of propylene, high density ethylene, 4-methyl pentene-1 and 4-methyl butene-1 and (b) from 5% to 30% by weight of a compatible hydrogenated hydrocarbon polymer having an average molecular weight of at least about 500 (Rast), a softening point above 70° C. (Hercules, drop) and an iodine value less than 50, said biaxially oriented film being oriented to a greater degree in its longitudinal direction than its transverse direction and having a Gardner haze (wide angle) as measured by ASTM-D 1003-61 of less than 5%, a 45° specular gloss greater than 70 as measured by ASTM-D 2457-65T using a Gardner 45° specular gloss head, and which film is capable of forming a twist wrap which will retain a twist of at least 0.5.

2. A film according to claim 1 which is capable of forming a twist wrap which will retain a twist of at least 0.75.

3. A film according to claim 1 which has an elongation to break in its transverse direction of at least 100%.

4. A film according to claim 1 wherein the hydrogenated hydrocarbon polymer is selected from the group consisting of hydrogenated polymers of allo-ocimene, carene, isomerized pinene, pinene, dipentene, terpinene, terpinolene, limonene, turpentine, and mixtures thereof.

5. A film according to claim 1 wherein the composition further contains sufficient antistatic agent so that the surface resistivity of the film is not greater than $5 \times 10^{11}$ ohms.

6. A film according to claim 5 in which said antistatic agent is present in an amount from 0.01% to 0.5% by weight and has the formula

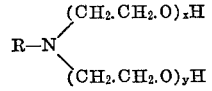

wherein the sum of $x$ and $y$ has a value from 2 to 5 inclusive and R is a monovalent aliphatic radical having from 12 to 22 carbon atoms inclusive and from 1.0% to 4.0% by weight of one or more glycerides.

7. A film according to claim 1 in which the said composition comprises (a) from 80% to 95% by weight of said crystalline α-olefine and (b) from 5% to 20% by weight of said hydrogenated hydrocarbon polymer.

References Cited

UNITED STATES PATENTS

| | | | |
|---|---|---|---|
| 3,313,754 | 4/1967 | Logan | 260—27 |
| 3,220,966 | 11/1965 | Flanagan | 260—27 |
| 3,371,130 | 2/1968 | Scifery et al. | 260—897 |
| 3,243,396 | 3/1966 | Hammer | 260—897 |
| 3,278,646 | 10/1966 | Lambert | 260—897 |

DONALD E. CZAJA, Primary Examiner

W. E. PARKER, Assistant Examiner

U.S. Cl. X.R.

260—27 R, 33.6 PQ, 896, 897